(12) United States Patent
Dubhashi et al.

(10) Patent No.: US 8,245,308 B2
(45) Date of Patent: Aug. 14, 2012

(54) USING TRUSTED THIRD PARTIES TO PERFORM DRM OPERATIONS

(75) Inventors: Kedarnath A. Dubhashi, Redmond, WA (US); Kenneth S. Reneris, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 582 days.

(21) Appl. No.: 12/133,356

(22) Filed: Jun. 4, 2008

(65) Prior Publication Data

US 2009/0307780 A1    Dec. 10, 2009

(51) Int. Cl.
*G06F 7/04* (2006.01)
(52) U.S. Cl. .............................................. 726/27
(58) Field of Classification Search ............ 726/27
See application file for complete search history.

(56) References Cited

U.S. PATENT DOCUMENTS

| | | | |
|---|---|---|---|
| 6,850,252 B1 | 2/2005 | Hoffberg | |
| 7,296,154 B2 | 11/2007 | Evans et al. | |
| 7,308,573 B2 | 12/2007 | Kostal et al. | |
| 2003/0005327 A1 | 1/2003 | Durand et al. | |
| 2004/0054894 A1 | 3/2004 | Lambert | |
| 2004/0107368 A1 | 6/2004 | Colvin | |
| 2005/0132209 A1 | 6/2005 | Hug et al. | |
| 2005/0265550 A1 | 12/2005 | Tuyls et al. | |
| 2006/0107330 A1* | 5/2006 | Ben-Yaacov et al. ........... 726/26 |
| 2007/0078924 A1 | 4/2007 | Hassan et al. | |
| 2007/0136817 A1* | 6/2007 | Nguyen ........................ 726/26 |
| 2008/0013724 A1 | 1/2008 | Shamoon et al. | |

OTHER PUBLICATIONS

Alawneh, et al., "Combining DRM with Trusted Computing for Effective Information Access Management", retrieved at <<http://www.isg.rhul.ac.uk/~pqai205/DRM-TC.pdf>>, pp. 6, 2008.
Korba, et al., "Towards Meeting the Privacy Challenge: Adapting DRM", Published in 2002 ACM Workshop on Digital Rights Management, Held in Conjunction with the Ninth ACM Conference on Computer and Communications Security, Nov. 2002, National Research Council of Canada, pp. 17.
Arnab, et al., "Security Considerations for an Idealised DRM Framework" 2004, pp. 2.

* cited by examiner

*Primary Examiner* — Jacob Lipman
(74) *Attorney, Agent, or Firm* — Wolfe-SBMC (57) ABSTRACT

Various embodiments utilize a third party, such as a trusted third-party, to perform DRM operations such as "move" operations. In at least some embodiments, the trusted third-party is utilized for both "move" operations as well as local content access such as playback and the like. In at least some embodiments, a third-party maintains a database that includes an association of clients, content, and move version numbers. A client—termed a "source client" maintains at least a move version number locally in a secure fashion. The version number is incremented each time the source client performs a move operation. Both the source client and the third-party increment the version number each time a piece of content is moved. When the client attempts to perform a move operation, it contacts the third-party to ascertain the third-party's move version number. If the move version numbers match and the source client owns the license/content, then, in at least some embodiments, a move operation is permitted.

17 Claims, 5 Drawing Sheets

USING TRUSTED THIRD PARTIES TO PERFORM DRM OPERATIONS

BACKGROUND

Electronic content, such as electronic media content, can be protected using digital rights management (DRM) techniques. DRM techniques can utilize various licenses to protect content and limit how and by whom the content can be consumed. So, for example, a user may purchase a piece of content over the Internet and a license associated with that content may limit how many times and on what devices the content can be consumed. Some DRM techniques allow a user to transfer or move a piece of content from one computing device to another. So, for example, a user may purchase a song over the web and store the song on their personal computer. They may later transfer that song to their laptop device or a hand-held device.

Some DRM techniques enable users to move content, through a "move" operation, from device to device, but attempt to limit the user from consuming the content on a device from which the content was transferred. The complexity of implementing a "move" operation arises from the fact that today, DRM state information is stored locally on a user's computing device. Thus, such DRM state information can be subject to what is known as a rollback attack. In a rollback attack, state variables associated with DRM state for a piece of content are copied to a location, such as an external hard drive or use an operating system feature such as a volume snapshot, and the content is then moved to another device. The state variables are then restored on the transferring device so that it looks to the DRM system as if no state changes have taken place when, in fact, the content and the associated license have been moved or copied to a different device.

Attacks such as this and others can thus allow the user to consume the transferred content on two devices in an unauthorized manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments utilize a third party, such as a trusted third-party, to perform DRM operations such as "move" operations. In at least some embodiments, the trusted third-party is utilized for both "move" operations as well as local content access such as playback and the like.

In at least some embodiments, a third-party maintains a database that includes an association of clients, content, and move version numbers. A client—termed a "source client" maintains at least a move version number locally in a secure fashion. The version number is incremented each time the source client performs a move operation. Both the source client and the third-party increment the version number each time a piece of content is moved. When the client attempts to perform a move operation, it contacts the third-party to ascertain the third-party's move version number. If the move version numbers match and the source client owns the license/content, then, in at least some embodiments, a move operation is permitted.

BRIEF DESCRIPTION OF THE DRAWINGS

The same numbers are used throughout the drawings to reference like features.

DETAILED DESCRIPTION

Overview

Various embodiments utilize a third party, such as a trusted third-party, to perform DRM operations such as "move" operations. In at least some embodiments, the trusted third-party is utilized for both "move" operations as well as local content access such as playback and the like.

In at least some embodiments, a third-party maintains a database that includes an association of clients, content, and move version numbers. A client—termed a "source client" maintains at least a move version number locally in a secure fashion. The version number is incremented each time the source client performs a move operation. Both the source client and the third-party increment the version number each time a piece of content is moved. When the client attempts to perform a move operation, it contacts the third-party to ascertain the third-party's move version number. If the move version numbers match and the source client owns the license/content, then, in at least some embodiments, a move operation is permitted.

In the discussion that follows, a section entitled "Operating Environment" describes but one operating environment that can be utilized to practice the inventive principles described herein in accordance with one or more embodiments. Following this, a section entitled "Using Move Lists to Implement DRM Operations" describes how, in some embodiments, a move list can be utilized to implement DRM operations. Next, a section entitled "Offline Operations" describes how offline operations can be performed in accordance with one or more embodiments. Following this, a section entitled "Maintaining Move List on Client" describes how move lists can be maintained on a client in accordance with one or more embodiments. Next, a section entitled "Recovery from Failure Situations" describes how failures can be recovered in one or more embodiments. Following this, a section entitled "Scalability" describes scalability issues in accordance with one or more embodiments. Next, a section entitled "Trusted Third-Party Entities" describes various trusted third-party entities in accordance with one or more embodiments. Last, a section entitled "Example System" describes an example system that can be utilized to implement one or more embodiments.

Operating Environment

Figure 1:
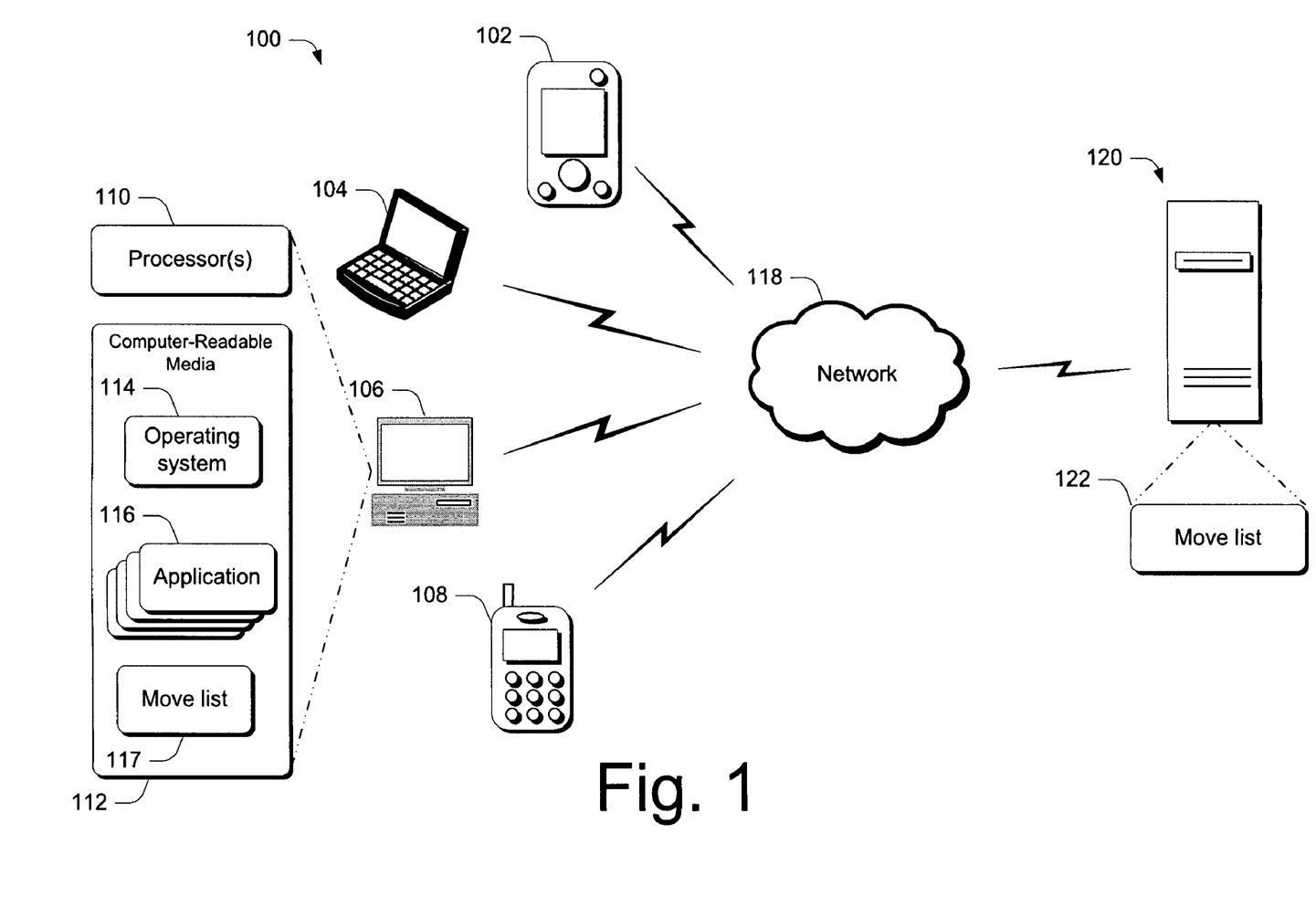
FIG. 1 illustrates an operating environment in accordance with one or more embodiments.

FIG. 1 illustrates an operating environment in accordance with one or more embodiments, generally at 100. Operating environment 100 includes multiple different computing devices, examples of which are shown at 102, 104, 106, and 108. The computing devices can be used by a user to consume licensed content, examples of which can include textual content, video content, audio content, audio/visual content such as various types of multimedia content including games, and the like. Individual computing devices can typically include one or more processors 110, one or more computer-readable media 112, an operating system 114 and one or more applications 116 that reside on the computer-readable media and which are executable by the processor(s). Applications 116 can include an application that enables a user to consume licensed content. Such application can include, by way of example and not limitation, a media playing application or any other type of application that can enable distributed content to be consumed by a user. Applications can also include, in one or more embodiments, a trusted digital rights management (DRM) agent that performs DRM-related tasks such as those described herein. For example, the DRM agent can maintain move version numbers and use the move version numbers to protect content as described below.

In addition, in one or more embodiments, computer readable media 112 can include a move list 117 that describes content that has been moved from one client device to another, as well as the move version number mentioned above. The move list can be thought of as a revocation list because it describes content that has been moved from a source device to a target device.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 118, such as a local network or the Internet, via which licensed content and other data can be received and sent.

Licensed content and other data or information can be received over network 118 by way of a server 120 that has access to the content and/or information associated with the content. In at least some embodiments, server 120 constitutes a trusted third-party. In some embodiments, server 120 can include a move list 122 associated with multiple different clients. The move list can include a move version number and describes content that has been moved from one client device to another. In one or more embodiments, as with the client's move list, the move list 122 can be thought of as a revocation list. In other embodiments, as will be discussed below, the server 120 can maintain, instead of a move list having a version number, simply the version number associated with a particular client. In this case, the client is responsible for maintaining the move list.

The version numbers and/or move lists on the client device and the server are utilized to enable or disable move operations when a client attempts to move content, as described below in more detail.

The computing devices can be embodied as any suitable computing device such as, by way of example and not limitation, a desktop computer (such as computing device 106), a portable computer (such as computing device 104), a handheld computer such as a personal digital assistant (such as computing device 102), a cell phone (such as computing device 108), and the like. One example of a computing device is shown and described below in relation to FIG. 5.

Having discussed the general notion of an example operating environment in which various embodiments can operate, consider now a discussion of move lists and how such lists can be utilized to implement DRM operations.

Using Move Lists to Implement DRM Operations

Figure 2:
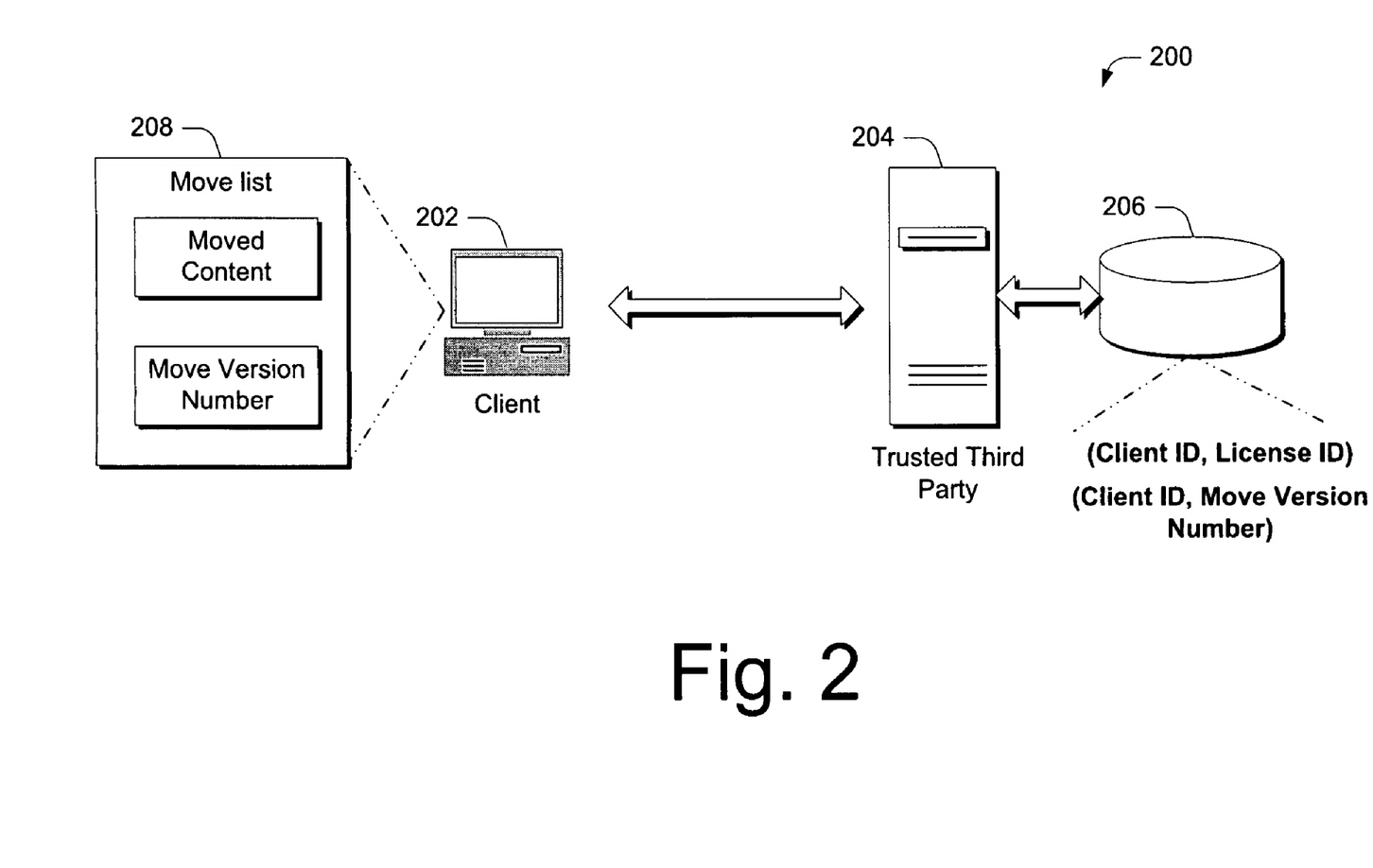
FIG. 2 illustrates a system in accordance with one or more embodiments.

FIG. 2 illustrates a system generally at 200 in accordance with one or more embodiments. In the discussion that follows, system 200 can be utilized to permit, among other DRM operations, move operations and local access operations.

In this example, system 200 includes a client computing device 202 and a trusted third-party in the form of a server 204. Server 204 maintains a database 206 that includes associations between client IDs and license IDs, and associations between client IDs and move version numbers. These associations can be embodied as a move list. The client IDs correspond to individual client devices that communicate with server 204 to effect DRM operations. The license IDs correspond to individual licenses that are associated with individual pieces of content. The move version number corresponds to an incremental number that describes the number of move operations a client has performed.

In addition, client 202 can, in at least some embodiments, include a move list 208 which, in turn, includes information associated with content that has been moved to another device, and a move version number that corresponds to the move version number maintained by server 204. Although the moved content and move version number are shown as residing on move list 208, such could reside separately from one another.

When client computing device 202 (termed a source device) wishes to perform a move operation to a target device, it sends a message to server 204 that can include its client ID and a license ID associated with content that is the subject of the move operation. In some embodiments, typically for failure scenarios, the target device ID can also be sent to the server. When server 204 receives this message, the server checks database 206 to ascertain whether this particular source client has previously done a move operation on content sharing the same license ID. If this is the first time that a move operation has been attempted, the server records an entry in database 206 and allows the move. The entry can be made by updating the move list for the source client to include the license ID. Correspondingly, the move list for the target device can be updated to remove this license ID. In at least some embodiments, the server may also maintain an "allowed list" for the target device to describe which content is allowed to be consumed on the target device. This can be useful in failure scenarios such as crashes on the source device that occur after the source device and server have updated their move lists but before content is moved to the target device.

Correspondingly, the source client device then performs the actual move operation by moving content to the target device and deleting both the content's associated license and the content on the source client device.

The server 204 then returns a signed list of license IDs to the client. The signed list of license IDs corresponds to the "moved content" that resides on move list 208. The move list thus describes content which has been moved from the source device. During move operations, both client device and server increment their move version numbers so that, when everything is operating as it should, the numbers correspond to one another. This is done for each move operation that is conducted. That is, at this stage, the client has a move list that describes content that has been moved to other devices, as well as a move version number that is used for comparison purposes with the move version number maintained by the database 206.

Once the license has been moved to the target device, the content is not playable on the source device because the content has been deleted. If, at this point, a user attempts to roll back the state of the client device in order to play content that has been transferred, such operation will fail for a couple of different reasons. First, since the content has been deleted, it is no longer present on the client device. Second, if the content is attempted to be transferred back to the source device, the move version numbers maintained at the client device and the server will not match and, accordingly, the move operation will not be permitted.

Figure 3:
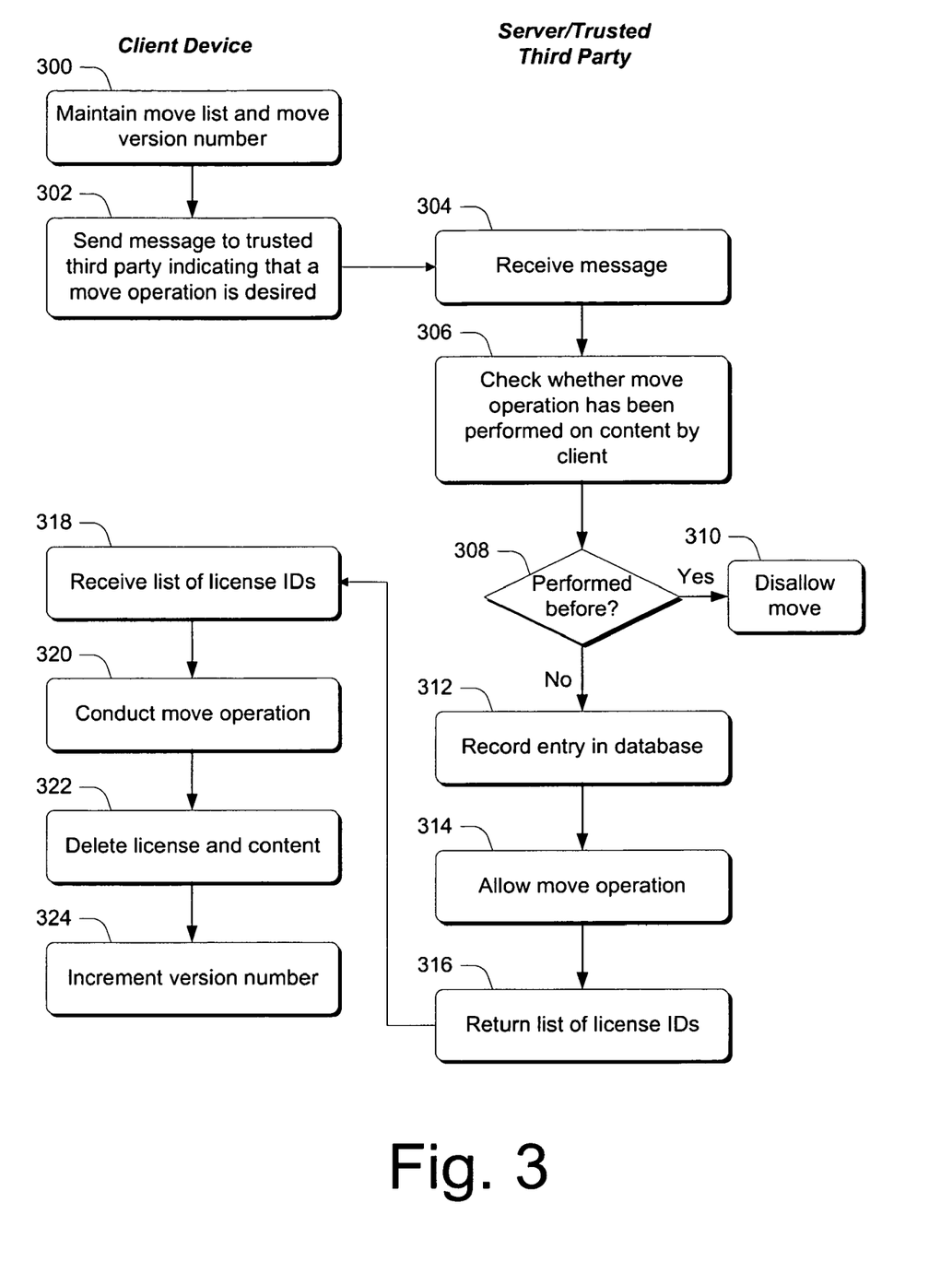
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware, or combination thereof. In at least some embodiments, aspects of the described method can be implemented by software executing on a user's computing device, such as a trusted DRM agent. These aspects appear under the heading "Client Device". Likewise, aspects of the described method can be implemented by software executing on a suitably-configured server or trusted third party. These aspects appear under the heading "Server/Trusted Third Party".

Step 300 maintains a move list and move version number on a client computing device. Step 302 sends a message to a trusted third-party indicating that a move operation is desired. This step can be performed in any suitable way. For example, if a user on the client computing device wishes to move a particular piece of content to another computing device, DRM agent software executing on the client's computing device can generate this message.

Step 304 receives the message and step 306 checks to ascertain whether a move operation has been performed on this content by the client computing device. This step can be performed by checking client IDs and license IDs that are received in the message. If, at step 308, a move operation has been performed before, step 310 can disallow the move operation. If, on the other hand, a move operation has not been performed before on this particular piece of content, step 312 records an entry in a database maintained by the server. Examples of how this can be done are provided above. For example, this entry can include incrementing a move version number maintained by the server, as well as establishing an entry that associates a target computing device with the license ID associated with the content that is to be moved. Step 314 allows the move operation by, for example, communicating approval of the move operation to the DRM agent executing on the client device. Step 316 returns a list of license IDs to the client device.

Step 318 receives the list of license IDs which is then maintained by the client device. Step 320 conducts the move operation and step 322 deletes the associated license and the content from the client computing device. Step 324 then increments the version number that is maintained by the client device.

Consider now local playback operations. Recall that client device 202 (FIG. 2) maintains its move version number locally in a secured fashion, for example signed with a private key of the trusted third-party or, in this case, server 204. Recall also that server 204 maintains an association of client IDs and move version numbers in its database 206. This version number is incremented by both the client device and the server each time the source client device performs a move operation.

Now, the first time the source client device wishes to consume or play content, if a license is marked in a particular way (such as having a flag or setting indicating that move protection is in place), the source client device sends a request to server 204 for a move version number. Responsive to receiving this request, server 204 returns a signed message indicating the move version number. The source client device then compares the received move version number with its locally-maintained move version number. If the version numbers match, and the license ID associated with the particular piece of content does not exist in a client's move list by, for example, appearing as "moved content", the client device or DRM agent allows the binding to occur.

This check can be cached for the lifetime of the process so that the client device need not contact the server 204 the next time a particular license with the particular setting needs to be accessed for content decryption.

Figure 4:
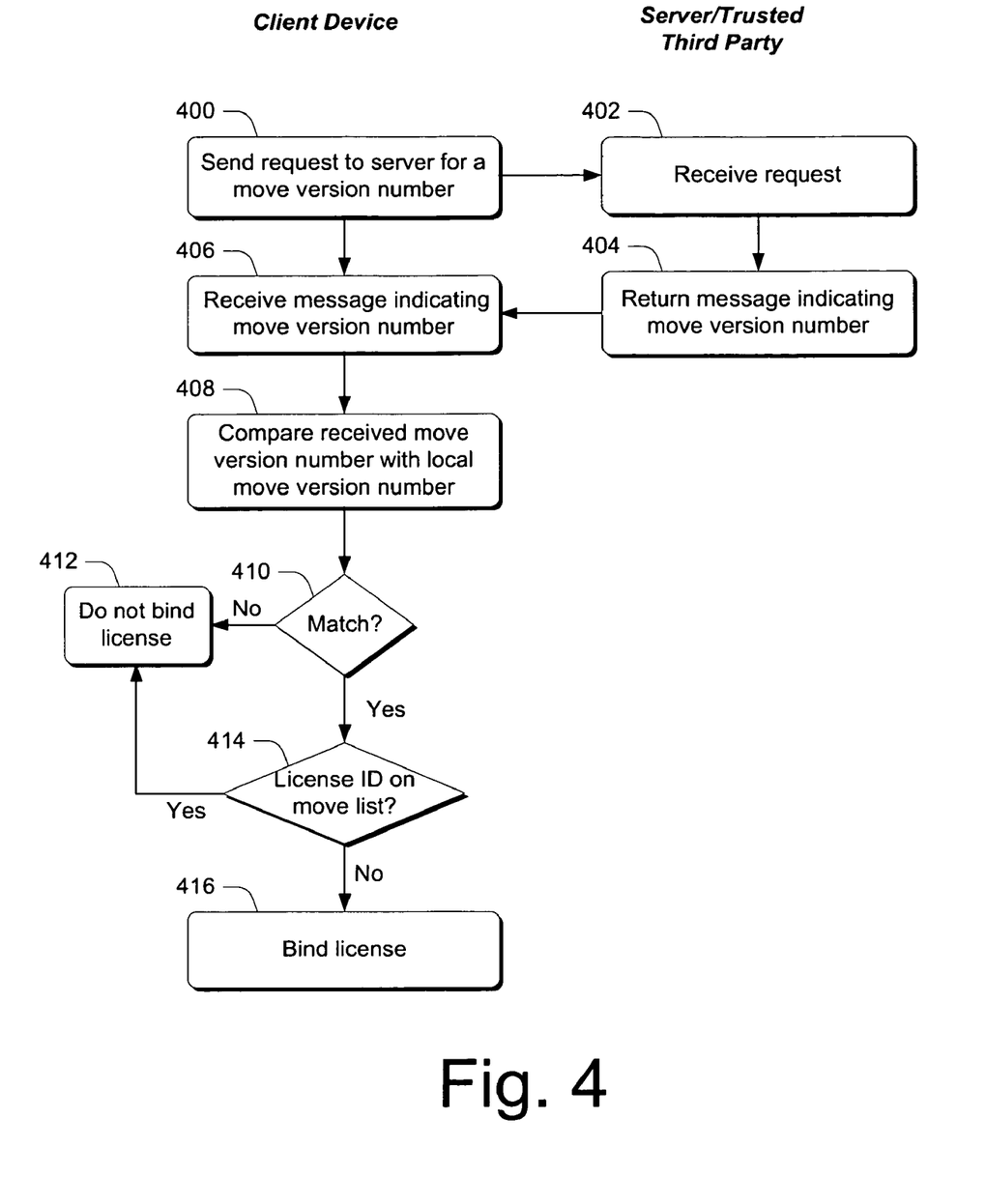
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware, or combination thereof. In at least some embodiments, aspects of the described method can be implemented by software, such as a DRM agent, executing on a user's computing device. These aspects appear under the heading "Client Device". Likewise, aspects of the described method can be implemented by software executing on a suitably-configured server. These aspects appear under the heading "Server/Trusted Third Party".

Step 400 sends a request to a server for a move version number. This step can be performed in any suitable way. For example, the step can be performed when a client attempts to bind a license with a particular piece of content. Such binding attempts can typically take place when the client device attempts to consume the content. Step 402 receives the request and step 404 returns a message indicating the move version number. The server can also return, in at least some embodiments, a move list to the client device.

Step 406 receives the message indicating the move version number. Step 408 compares the received move version number with a locally-maintained move version number. Step 410 ascertains whether the move version numbers match. If the move version numbers do not match, step 412 does not bind the license. If, on the other hand, the move version numbers match, in at least some embodiments, step 414 ascertains whether a license ID associated with the particular piece of content appears on a move list maintained by the client device. If the license ID appears on the move list, step 412 does not bind the license. If, on the other hand, the license ID does not appear on the move list, step 416 binds of the license and thus allows the user to consume the associated content.

Offline Operations

In some instances, such as off-line instances where network access is not available, a verification process can be used to ensure that the client's move list was updated within a defined period of time, such as 30 days. For example, if the client wishes to playback a particular piece of content but does not have network access, in at least some embodiments, as long as the move list was updated within a defined period of time, the content can be played. In at least some embodiments, the temporal verification is not used to conduct move operations. That is, in these embodiments, the move operation utilizes an active network connection in order to communicate with the trusted third-party or server 204.

Maintaining Move List on Client

In at least some embodiments, the burden of maintaining a move list is placed on the client device and removed from the trusted third party or server. In this case, the trusted third-party maintains the move version numbers and the client device maintains the move version numbers and the move list. The client device can store the move list in a protected manner such as, by way of example and not limitation, signing the move list with its own private key.

Recovery From Failure Situations

In some instances, a client device can experience a significant system malfunction in which system data such as DRM state data is lost. In these instances, if the client device attempts to restore the system, it may end up with an old copy of the move list. Accordingly, in this situation, the client device can contact the trusted third-party to receive a new, up-to-date move list. However, because the move list is essentially a revocation list, the move list will simply inform the client as to which content it cannot play. If, before the system malfunctioned, content was transferred to a different device, this different receiving device will not necessarily know that it can play a particular piece of content that was transferred to it. Accordingly, in at least some embodiments, the trusted third-party or server can maintain an allow list which, from the server's point of view, indicates which entities can play which content. Accordingly, the allow list can help a system recover from a failure.

Scalability

As one can appreciate from the above discussion, in some situations, information maintained by the trusted third-party or server can grow in an unbounded fashion. That is, as the number of client devices grow, the information maintained by the trusted third-party or server will grow as well.

Accordingly, in at least some embodiments, thresholds can be set that define how long the trusted third-party is to maintain data on a move list. For example, the trusted third-party may maintain data on a move list for 6 or 12 months after which time the data is removed. In these instances, the client can maintain older historical move lists. If the client wishes to move content on its historical move list, then in at least some embodiments, the historical move list can be sent to the server to get the content promoted back onto the active move list.

Trusted Third Party Entities

In the example above, a trusted third-party in the form of a web-accessible server was described. It is to be appreciated and understood, however, that other entities can serve as trusted third parties. For example, a trusted third-party may be embodied as a dongle or other type of hardware that connects to a computing device. For example, a smartcard-based third-party can be employed. In at least some embodiments, the smartcard can be provisioned with a private key and locked at manufacture time so that the file system on the smartcard is not accessible to the user. Software code can be burned into EPROM so that it cannot be tampered with by the user. Alternately or additionally, a USB flash drive with a processor can be employed as a trusted third-party entity.

Having described example embodiments above, consider now a discussion of an example system that can be utilized to implement one or more embodiments.

Example System

Figure 5:
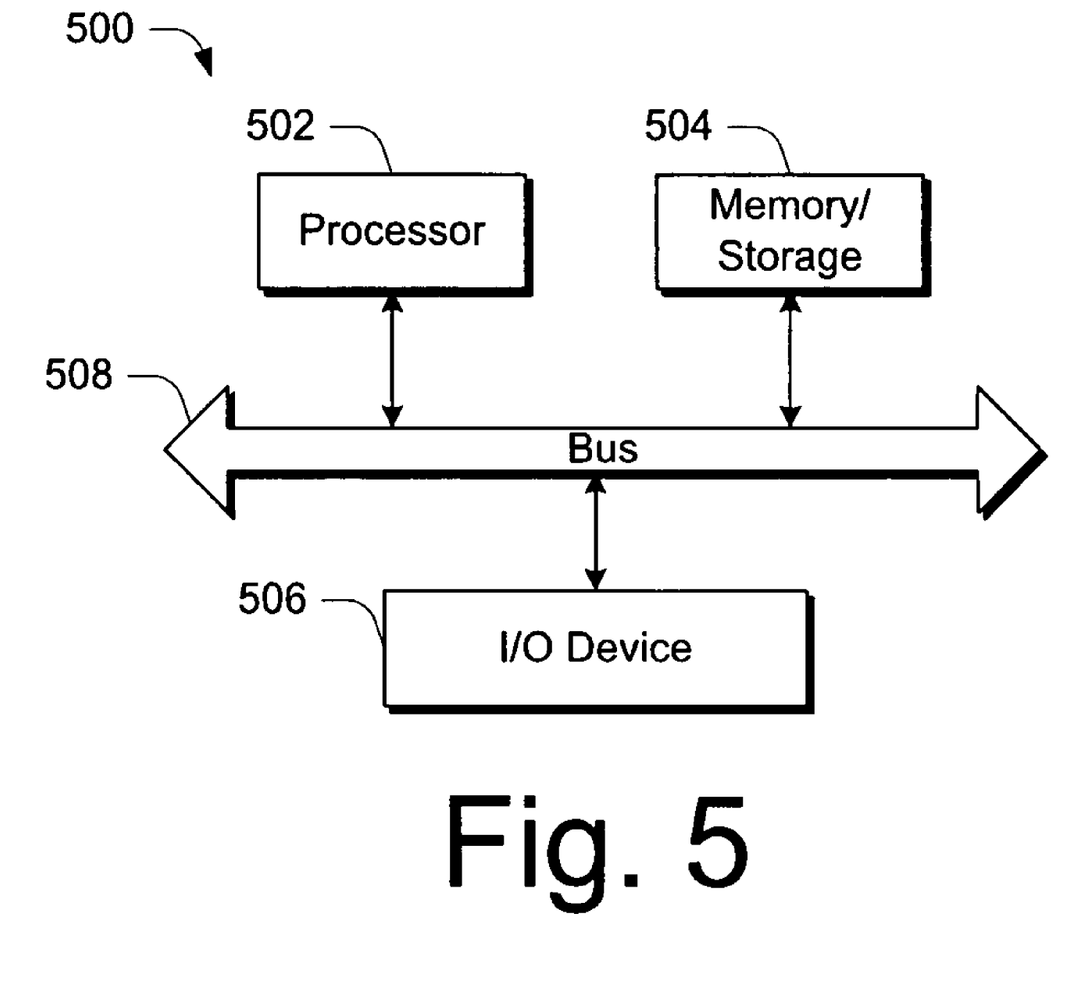
FIG. 5 is a block diagram of an example system that can be utilized to implement one or more embodiments.

FIG. 5 illustrates an example computing device 500 that can implement the various embodiments described above. Computing device 500 can be, for example, various computing devices or servers, such as those illustrated in FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or nonvolatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments utilize a third party, such as a trusted third-party, to perform DRM operations such as "move" operations. In at least some embodiments, the trusted third-party is utilized for both "move" operations as well as local content access such as playback and the like.

In at least some embodiments, a third-party maintains a database that includes an association of clients, content, and move version numbers. A client—termed a "source client" maintains at least a move version number locally in a secure fashion. The version number is incremented each time the source client performs a move operation. Both the source client and the third-party increment the version number each time a piece of content is moved. When the client attempts to perform a move operation, it contacts the third-party to ascertain the third-party's move version number. If the move version numbers match and the source client owns the license/content, then, in at least some embodiments, a move operation is permitted.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   maintaining at least a move version number and a client move list on a client computing device, the client move list describing content that has been moved from the client computing device to one or more other computing devices, the move version number being associated with the content that has been moved to the one or more other computing devices;
   sending a message to a trusted third-party indicating that a move operation is desired for a particular piece of content;
   receiving a communication from the trusted third-party indicating approval of the move operation, the communication including a server move list that describes the content that has been moved from the client computing device to the one or more other computing devices and which cannot be consumed by the client computing device, the approval being based on a determination that the client computing device has not performed a previous move operation on the particular piece of content;
   conducting the move operation on the particular piece of content if the particular content is not listed in the server move list;

incrementing the move version number; and
updating the client move list to indicate that the particular piece of content has been moved from the client computing device to another computing device.

2. The method of claim 1, further comprising receiving a list of license IDs from the trusted third-party and maintaining the list of license IDs in the client move list.

3. The method of claim 1, wherein the trusted third-party comprises a server.

4. The method of claim 1, wherein the trusted third-party comprises an entity other than a server.

5. The method of claim 1 further comprising, responsive to conducting the move operation, deleting an associated license and content associated with the license from the client computing device.

6. The method of claim 1 further comprising:
sending a request to the trusted third-party for a move version number maintained by the trusted third-party;
receiving a message indicating the move version number maintained by the trusted third-party;
comparing the move version number maintained by the trusted third-party with the move version number maintained by the client computing device; and
allowing consumption of associated content if the move version numbers match.

7. The method of claim 6, wherein said sending a request is performed responsive to attempting to bind a license to the particular piece of content.

8. The method of claim 6 further comprising ascertaining whether a license ID associated with the particular piece of content appears on the client move list maintained by the client computing device, and performing said allowing if the license ID does not appear on the client move list.

9. The method of claim 6, wherein said allowing is performed if the client move list has been updated within a defined period of time.

10. A client computing device, comprising:
one or more computer readable media; and
a processor configured to execute one or more applications that reside on the computer-readable media, the one or more applications configured to:
maintain at least a move version number and a client move list on the client computing device, the client move list describing content that has been moved from the client computing device to one or more other computing devices, the move version number being associated with the content that has been moved from the client computing device to the one or more other computing devices;
send a message to a trusted third-party indicating that a move operation is desired;
receive a communication from the trusted third-party indicating approval of the desired move operation, the communication comprising a server move list that describes content that cannot be consumed by the client computing device based at least in part on movement to another device, the approval based on a determination that the client computing device has not performed a previous move operation on content sharing a same license ID as a license ID associated with a subject of the desired move operation;
conduct the desired move operation if the subject of the desired move operation is not listed in the server move list;
increment the move version number; and
update the client move list to indicate that the subject of the desired move operation has been moved from the client computing device.

11. The client computing device of claim 10, wherein the one or more applications are further configured to:
receive a list of license IDs from the trusted third-party; and
maintain the list of license IDs in the client move list.

12. The client computing device of claim 10, wherein the trusted third-party comprises a server.

13. The client computing device of claim 10, wherein the one or more applications are further configured to send a request to the trusted third-party for a move version number maintained by the trusted third party in response to an attempt to bind a license to a particular piece of content.

14. The client computing device of claim 10, wherein the one or more applications are further configured to, responsive to the move operation being conducted, delete an associated license and content associated with the license from the client computing device.

15. The client computing device of claim 10, wherein the one or more applications are further configured to:
send a request to the trusted third-party for a move version number maintained by the trusted third-party;
receive a message indicating the move version number maintained by the trusted third-party;
compare the move version number maintained by the trusted third-party with the move version number maintained by the client computing device; and
allow consumption of associated content if the move version numbers match.

16. One or more computer-readable storage media embodying computer-readable instructions which, when executed, implement a method comprising:
maintaining at least a client move list and a move version number on a client computing device, the client move list describing content that has been moved from the client computing device to one or more other computing devices, the move version number being associated with the content that has been moved to the one or more other computing devices;
sending a message to a trusted third-party indicating that a move operation is desired for particular content;
receiving a communication from the trusted third-party indicating approval of the move operation, the communication including a server move list that describes the content that has been moved to the one or more other computing devices by the client computing device, the server move list describing content that cannot be consumed by the client computing device, the approval being based on a determination that the particular content has not been previously moved by the client computing device;
conducting the move operation based on the approval and based on the server move list lacking the particular content;
incrementing the move version number; and
updating the client move list to include information associated with the conducted move operation to indicate that the particular content has been moved from the client computing device to another computing device.

17. The one or more computer-readable storage media of claim 16, further comprising receiving a list of license IDs from the trusted third-party and maintaining the list of license IDs in the client move list.

* * * * *